United States Patent [19]

Ueoka et al.

[11] Patent Number: 5,318,934
[45] Date of Patent: Jun. 7, 1994

[54] CATALYST FOR EXHAUST GAS CLEANING

[75] Inventors: Toshitsugu Ueoka, Hiroshima; Masahiko Shigetsu; Takashi Takemoto, both of Higashi-Hiroshima, all of Japan

[73] Assignee: Mazda Motor Corporation, Hiroshima, Japan

[21] Appl. No.: 996,222

[22] Filed: Dec. 23, 1992

[30] Foreign Application Priority Data

Dec. 27, 1991 [JP] Japan ................................ 3-346833

[51] Int. Cl.$^5$ .......................... B01J 29/06; B01J 29/30
[52] U.S. Cl. ........................................ 502/61; 502/60; 502/71; 423/239.2
[58] Field of Search ................... 423/213.2, 213.5, 239, 423/239.2; 502/61, 60, 71

[56] References Cited

U.S. PATENT DOCUMENTS

| | | | |
|---|---|---|---|
| 3,431,219 | 3/1969 | Argauer | 502/61 |
| 4,297,328 | 10/1981 | Ritscher et al. | 423/213.2 |
| 4,946,813 | 8/1990 | Shum | 502/61 |

FOREIGN PATENT DOCUMENTS

| | | |
|---|---|---|
| 0003486 | 8/1979 | European Pat. Off. . |
| 0518341 | 12/1992 | European Pat. Off. . |
| 3805734 | 8/1989 | Fed. Rep. of Germany ... 423/213.2 |
| 3932452 | 4/1990 | Fed. Rep. of Germany . |
| 2106826 | 5/1987 | Japan ............................. 423/213.2 |
| 2-265649 | 10/1990 | Japan . |
| 3101836 | 4/1991 | Japan ............................. 423/213.2 |
| 92/12096 | 7/1992 | World Int. Prop. O. . |

*Primary Examiner*—Carl F. Dees
*Attorney, Agent, or Firm*—Keck, Mahin & Cate

[57] ABSTRACT

A catalyst for cleaning an exhaust gas includes a metal containing silicate containing Al and a metal M constituting a crystalline structure which is selected from a group consisting of Ga, In, B, Mn, Bi, Sc Y, V and Ta, a transition metal or a precious metal being carried in said metal containing silicate. The catalytic active range can be expanded.

6 Claims, 2 Drawing Sheets

CATALYST FOR EXHAUST GAS CLEANING

BACKGROUND OF THE INVENTION

1. Field of the Invention

The present invention relates to exhaust gas cleaning catalyst composition.

2. Description of the Prior Art

As an exhaust gas cleaning catalyst, a three way catalyst which oxidizes CO(carbon monoxide) and HC(hydrocarbon) as well as reduces NOx (nitrogen oxide) has been generally known. The three way catalyst includes Pt (platinum) and Rh (rhodium) carried by Gamma-alumina. The three way catalyst provides a high cleaning efficiency when the air fuel ratio (A/F) is controlled approximately to the theoretical ratio or 14.7.

Meanwhile, in the field of the automobile, it is generally required that the air fuel ratio is increased or the air fuel mixture as an intake gas is controlled as lean as possible to improve the fuel consumption efficiency. In this case, the exhaust gas includes an excessive oxygen, in other words, the exhaust gas is so called a lean composition. As a result, the carbon monoxide and hydrocarbon included in the exhaust gas can be oxidized when passing through the three way catalyst. However, the reduction of Nox is difficult in such a lean mixture so that Nox in the exhaust gas cannot be effectively removed.

Recently, a research is conducted for improving a zeolite catalyst which includes transition metal carried therein by means of ion-exchange. If the zeolite catalyst is used for the exhaust gas cleaning, NOx can be catalytically cracked directly or by virtue of the reducer such as CO, HC and the like which coexist with NOx.

As another type of catalyst, in Japanese Patent Public Disclosure No. 2-265649, laid open to the public in 1990, there is disclosed an A type copper silicate catalyst which includes Al and Cu as metallic component constituting crystal structure.

The zeolite catalyst provides a relatively high catalytic activity around 400 degree centigrade. However, the active thermal range is relatively narrow. The temperature of the exhaust gas of the automobile could be ranged from about 800 to 900 degree centigrade.

SUMMARY OF THE INVENTION

It is therefore an object of the present invention to improve the thermal durability of an exhaust gas cleaning catalyst.

It is another object of the present invention to expand the active range of the catalyst in the lower and higher thermal range.

According to the research of the present invention, in the field of metal containing silicate in which a part of Al atoms constituting crystal structure of zeolite is replaced by other metals (crystalline porous silicate having pores of micron order size), it is found that the use of MFI type as crystalline structure and specific element of stable 3 valences as the above mentioned other metals is effective in order to improve the thermal durability and expand the active thermal range.

According to the present invention, a catalyst for cleaning an exhaust gas comprises a metal containing silicate containing Al and a metal(including semi-metal) M constituting a crystalline structure which is selected from a group consisting of Ga, In, B, Mn, Bi, Sc Y, V and Ta, a transition metal or precious metals being carried in said silicate.

It is preferable that the amount of the transition metal or precious metal included in the metal containing silicate are not less than 1.5 wt %.

The metal containing silicate may preferably comprises Si and Al in a range of $15 = < Si/Al = < 100$ and the metal M in a range of $15 = < Si/M = < 150$ when the metal M is a transition metal ion, in a range of $15 = < Si/M = < 6000$ when the metal is a precious metal.

The above catalyst according to the present invention provides an improved thermal durability. This is because the crystalline structure of the silicate as a matrix of the catalyst is a MFI type zeolite structure.

As the component forming the crystalline structure, a metal M selected from a group of Ga, In, B, Mn, Bi, Sc and Y is combined with Al. The catalyst according the present invention provides not only a desirable catalytic activity as high as the conventional crystalline Al silicate catalyst because of the existence of Al but also provides an expanded catalytic active thermal range by virtue of the above specific metal M.

Ga, In and B among the metal M is effective to expand the catalytic thermal active range toward a higher temperature. The other metals, such as Mn is effective to expand the active range toward a lower temperature.

The metal M is of a stable three valence which functions to improve the catalytic activity.

The catalyst as suggested by the present invention carries a transition metal by means of the ion exchange. If a metal, such as Ti of a stable four valence is used for forming a crystalline structure, there will be no improvement in the catalytic activity. This is because there is no shortage in the electrical charge in the metal of four stable valence as well as Si so that the ion exchange site cannot be obtained enough to carry the transition metal as an activity seed. With the present invention, the metal M is of the three stable valence which provides a relatively stable ion exchange site. Thus, a high catalytic activity can be obtained.

It is desirable that the molecular ratio of Si/Al is less than 100 and molecular ratio of Si/M is less than 150. As a result, the number of the ion exchange site is increased to provide a transition metal carried in the silicate as much as possible through the ion exchange so as to expand the active thermal range of the catalyst.

As the transition metal, Cu can be used advantageously. The other transition metals such as Co, Cr, Ni and the like can be employed effectively. In order to carry the transition metal in the metal containing silicate, the ion exchange method can be advantageously employed. However, the present invention is not limited to the ion exchange method but another method such as impregnating method for carrying the transition metal can be effectively applied for the present invention.

The above catalyst according to the present invention is preferably carried by a carrier such as cordierite, and other inorganic porous carrier.

As aforementioned, the catalyst according to the present invention comprises a MFI type metal containing silicate containing Al and a metal M selected from a group of Ga, In, B, Mn, Bi, Sc, Y, V and Ta as a metallic component for forming a crystalline structure, the MFI metal containing silicate carrying a transition metal, a precious metal or both. The catalyst according to the present invention improves the thermal durability and expands the catalytic thermal active range.

The above and other features of the present invention will be apparent from the detailed description taking reference with the accompanying drawings.

DETAILED DESCRIPTION OF THE PREFERRED EMBODIMENTS

Figure 1:
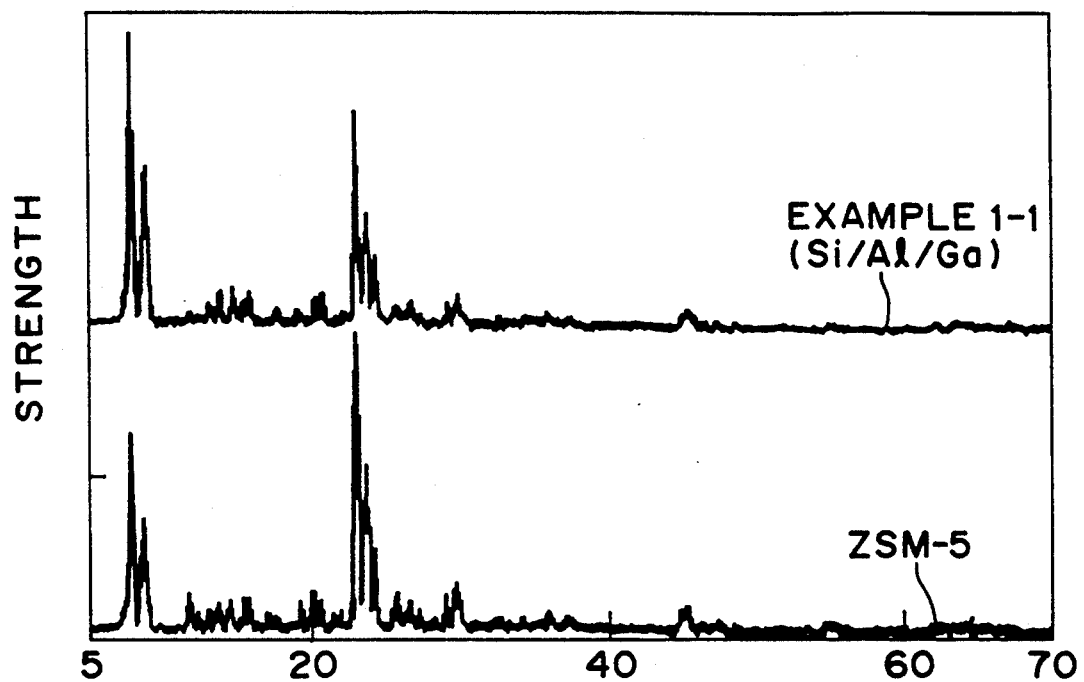
FIG. 1 is X-ray diffraction diagram of example 1-1 and comparative example 1.

Hereinafter, there is described a preferred embodiment of the present invention.

Preparation of the Catalyst

EXAMPLE 1

A predetermined amount of No. 3-water-glass (which is defined in Japanese standard K 1408 ), aluminum sulfate, gallium sulfate, sodium chloride and tetra-propyl ammonium bromine were solved into water and mixed with each other at pH 9 through pH 10.5 to get the starting material. The material was synthesized in an autoclave taking advantage of heated water to obtain a metal containing silicate powder containing Al and Ga which form a crystalline structure or skeleton. The material was gradually heated until about 210 degree centigrade under $N_2$ and kept at that temperature for about 8 hours. The resultant power was cleaned and dried at 150 degree centigrade for 12 hours and thereafter calcined at 540 degree for 3 hours.

The resultant powder was inspected. XRD (X-ray Diffraction) pattern thereof is similar to ZSM5's pattern. This means that the resultant powder is of MFI type structure. According to the quantitative analysis, composition ratio (molecular ratio) thereof was Si-/Al=41 and Si/Ga=60. Thus, the resultant powder is a MFI type metal containing silicate containing Al and Ga. This powder is formed with numerous micropores.

$Cu^{2+}$ was introduced to be carried on the powder through the ion exchange method in accordance with the following condition.

| | |
|---|---|
| Copper acetate solution | 0.05 mol/litter |
| Amount of the power | 10 g/litter |
| temperature of the solution | 50 degree centigrade |
| hold time | 24 hours |

The amount of $Cu^{2+}$ carried on the powder was 2.1 wt %.

The catalyst (Cu/Si-Al-Ga-O) obtained through the above procedure was mixed with a binder (hydrate alumina). Then, a predetermined amount of water was added to the mixture to get a slurry of the mixture which was then coated on a honeycomb carrier of cordierite (400 cell). The resultant material is dried at 120 degree centigrade and calcite at 500 degree centigrade to prepare a sample 1-1. The amount of the catalyst carried on the honeycomb carrier is 2 g/55 cc.

Through the similar procedure, various catalysts were prepared in which Si/Al ratio, Si/Ga ratio and the amount of $Cu^{2+}$ carried on the catalyst vary as shown in Table 1 so that samples 1-2 through 1-5 for cleaning test.

EXAMPLES 2-4

In place of gallium sulfate, Manganese and the like were employed to obtained the metal containing silicate containing the metal M as an element forming a crystalline structure such as Mn, In and the like as well as Al through a method similar to the example 1. The resultant powder was used to prepare the catalyst as shown in Table 1, which is carried on the honeycomb carrier to obtain samples 2 through 4 through the same procedure as the example 1.

Each of the catalysts were recognized as MFI type zeolite structure by means of the X-ray diffraction.

EXAMPLE 5-7

A metal containing silicate (Si-Al-Ga-O) powder was prepared through the same way as the example 1 then the powder is treated to carry $Co^{2+}$, $Ni^{2+}$, $Mn^{2+}$ by means of the ion exchange method. The resultant catalyst powder is carried on the honeycomb carrier to prepare the samples (see Table 1).

COMPARATIVE EXAMPLE

Without using gallium sulfate, an alumino silicate (Si/Al=25) powder including Al as an element for forming the crystalline structure was prepared through the same way as the example 1. The powder was treated to be carried on a honeycomb carrier to prepare the sample. In the catalyst, $Cu^{2+}$ is carried by 3.0 weight %. According to XRD(X-ray Diffraction), the catalyst is formed with MFI type zeolite structure and ZSM5.

COMPARATIVE EXAMPLE 2-4)

A MFI type alumino silicate powder (Si/Al) was prepared through the same process as the comparative example. The powder was treated to carry $Co^2$, $Ni^{2+}$, $Mn^{2+}$ to prepare the catalysts. The catalysts were carried on the honeycomb carriers as well as the example 1 and prepared the samples (see Table 1).

COMPARATIVE EXAMPLES 5 AND 6

FER type Al-Ga base metal containing silicate (Si-Al-Ga-O) and FER type alumino silicate (Si-Al-O) were prepared. The silicate was treated to carry $Cu^{2+}$ through the ion exchange method as well as the example 1. The catalysts were treated to be carried on the honeycomb carrier by means of a wash coating to prepare the samples (see Table 1).

Cleaning Test

Cleaning efficiency of Nox was measured utilizing the above samples (in which the amount of the catalyst carried on each of the sample is about 2 g/55 cc) under the following conditions:

Test gas composition introduced into the samples

NO:2100 ppm, HC:6000 ppm, C:8%, $O_2$:8%, $CO_2$:10%, CO:0.2%, $H_2$:650 ppm.

Space velocity of the test gas=25000 $hr^{-1}$.

TABLE 1

| SAMPLE | CRYSTAL STRUCTURE | METAL M | Si/M | Si/Al | SEED | SEED AMOUNT (wt %) | ACTIVE RANGE (°C.) | MAX ACTIVITY (%) | MAX ACTIVITY AFTER HEAT (%) |
|---|---|---|---|---|---|---|---|---|---|
| EXAMPLE | | | | | | | | | |
| 1-1 | MFI | Ga | 60 | 41 | $Cu^{2+}$ | 2.1 | 400~600 | 57 | 40 |
| 1-2 | MFI | Ga | 115 | 74 | $Cu^{2+}$ | 3.1 | 400~590 | 51 | 36 |
| 1-3 | MFI | Ga | 39 | 110 | $Cu^{2+}$ | 3.0 | 390~600 | 59 | 33 |
| 1-4 | MFI | Ga | 131 | 19 | $Cu^{2+}$ | 3.6 | 380~600 | 67 | 55 |
| 1-5 | MFI | Ga | 237 | 46 | $Cu^{2+}$ | 4.3 | 390~570 | 55 | 25 |
| 2 | MFI | Mn | 42 | 39 | $Cu^{2+}$ | 2.0 | 360~560 | 47 | 30 |
| 3 | MFI | In | 32 | 40 | $Cu^{2+}$ | 2.2 | 390~590 | 56 | 31 |
| 4 | MFI | B | 124 | 42 | $Cu^{2+}$ | 2.3 | 400~590 | 62 | 29 |
| 5 | MFI | Ga | 60 | 41 | $Co^{2+}$ | 1.7 | 520~640 | 39 | 20 |
| 6 | MFI | Ga | 60 | 41 | $Ni^{2+}$ | 2.0 | 460~540 | 44 | 15 |
| 7 | MFI | Ga | 60 | 41 | $Mn^{2+}$ | 1.7 | 400~550 | 41 | 14 |
| 8 | MFI | Mn | 550 | 45 | Pt | 3.9 | 210~260 | 42 | 39 |
| 9 | MFI | Mn | 5500 | 55 | Pt | 3.9 | 210~250 | 40 | 38 |
| 10 | MFI | Mn | 80 | 20 | Pt | 3.6 | 210~240 | 38 | 29 |
| 11 | MFI | Mn | 550 | 70 | Rh | 2.0 | 220~250 | 30 | 27 |
| 12 | MFI | Mn | 5550 | 45 | Pt:Rh = 5:1 | 2.0 | 220~260 | 38 | 35 |
| 13 | MFI | Mn | 5550 | 45 | Pt:In = 3:1 | 4.2 | 210~260 | 48 | 42 |
| 14 | MFI | Mn | 5550 | 45 | Pt:In:Rh = 30:10:1 | 4.2 | 210~270 | 51 | 41 |
| 15 | MFI | Mn | 550 | 45 | Pd | 4.5 | 200~210 | 27 | 26 |
| 16 | MFI | Ga | 80 | 40 | Pt | 3.5 | 240~280 | 37 | 34 |
| 17 | MFI | Ga | 250 | 20 | Pt | 3.8 | 250~280 | 36 | 30 |
| 18 | MFI | — | — | 45 | Pt | 3.9 | 230~260 | 34 | 29 |
| 19 | MFI | — | — | 70 | Rh | 2.0 | 230~250 | 25 | 23 |
| 20 | MFI | — | — | 45 | Pd | 4.5 | 205~210 | 23 | 18 |
| 21 | MFI | Bi | 540 | 47 | Pt | 3.9 | 220~260 | 36 | 35 |
| 22 | MFI | Sc | 540 | 45 | Pt | 3.9 | 220~260 | 37 | 34 |
| 23 | MFI | Y | 550 | 46 | Pt | 3.9 | 215~260 | 40 | 36 |
| 24 | MFI | V | 560 | 45 | Pt | 3.9 | 210~250 | 38 | 37 |
| 25 | MFI | Ta | 540 | 44 | Pt | 3.9 | 220~250 | 36 | 36 |
| COMPARATIVE EXAMPLE | | | | | | | | | |
| 1 | MFI | — | — | 25 | $Cu^{2+}$ | 3.0 | 380~570 | 60 | 27 |
| 2 | MFI | — | — | 40 | $Co^{2+}$ | 1.5 | 490~600 | 42 | 18 |
| 3 | MFI | — | — | 40 | $Ni^{2+}$ | 1.8 | 450~510 | 46 | 15 |
| 4 | MFI | — | — | 40 | $Mn^{2+}$ | 1.5 | 400~500 | 38 | 12 |
| 5 | FER | Ga | 26 | 18 | $Cu^{2+}$ | 4.2 | 400~560 | 50 | 23 |
| 6 | FER | — | — | 17 | $Cu^{2+}$ | 3.8 | 390~530 | 52 | 18 |

The test result is shown in Table 1. The test result of sample 1-1, 1-2 and the comparative example 1 were shown in FIG. 2. In the Table 1, maximum activity is the maximum value of the cleaning efficiency through the test. When the precious metal is utilized, the catalytic activity range is improved in the lower temperature side as seen from the example 8 through 25 in Table 1.

Then, each of the samples were subjected to heat treatment of the following condition. Thereafter, the same cleaning test were carried out on the samples.

Atmospheric gas composition $O_2$:10%, $H_2O$, residue He

Temperature 600 degree centigrade heat time 8 hr

Test Result

Figure 2:
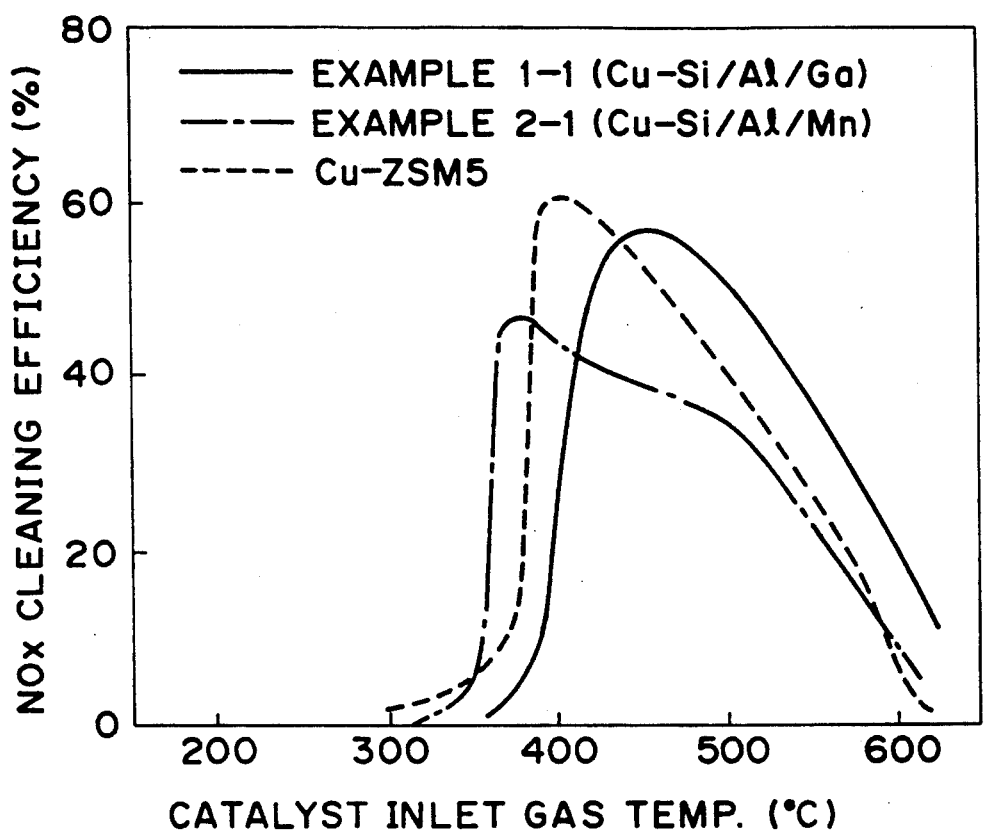
FIG. 2 is a graphical representation of a test result for cleaning the exhaust gas using the example 1-1, 2 and the comparative example 1.

As shown in FIG. 2, compared with the comparative example 1 (Cu/ZSM5), the catalyst (Cu/Si-Al-Ga-O) of the example 1-1 expands the catalytic active range in the higher temperature side and the catalyst (Cu/Si-Al-Mn-O) of the example 1-2i expands the catalytic active range in the lower temperature side with less reduction of Nox cleaning efficiency. It will be understood from this result that the composite of Al and Ga and composite Al and Mn are effective to expand the catalytic thermal active range.

As shown in Table 1, the catalytic thermal active range is reduced as a ratio Si/M is increased in the examples 1-1 through 1-5. It is recognized that the ion exchange site provided by Ga which functions to expand the catalytic thermal active range is reduced as the amount of Ga is reduced. The sample of which Si/M ratio is 237 is low in the maximum activity. Thus, it is preferred that the ratio Si/M is not more than about 150. The example 1-3 which has a relatively small Si/M ratio and large Si/Al (110) is low in the maximum activity after the heat treatment. Accordingly, it is preferable that Si/Al is not more than 100. This makes it easy that a sufficient amount of $Cu^{2+}$ is carried on the catalyst.

According to the working examples 2 and 3, it is found that the In and B are effective to expand the catalytic thermal active range as well as Ga.

According to the test result of the examples 1-1, 5 through 7, Cu as a transition metal carried on the MFI type gallium containing silicate (Si-Al-Ga-O) through the ion exchange exhibits a relatively good result. Compared with the working examples 1-1, 5 through 7, with the comparative example 1 through 4 (in which a transition metal is carried on ZSM5 by means of the ion exchange), it will be understood that the examples 1-1, 5 through 7 expands the catalytic thermal active range in the higher temperature side. Accordingly, when Al is combined with other metal such as Ga as a metal for forming a crystalline structure of the metal containing silicate, the catalytic thermal active range can be controlled whichever metal is carried on the catalyst through the ion exchange.

The catalysts of the comparative examples 5 and 6 are not MFI type but FER type so that the amount of $Cu^{2+}$ is increased compared with MFI type one but the thermal active range is reduced because of a low catalytic activity of itself. In addition, the FER type one is inferior in the thermal durability (see the maximum activity after the heat treatment).

Although the present invention has been explained with reference to a specific, preferred embodiment, one of ordinary skill in the art will recognize that modifications and improvements can be made while remaining within the scope and spirit of the present invention. The scope of the present invention is determined solely by the appended claims.

What is claimed is:

1. A catalyst for cleaning an exhaust gas comprises a metal containing silicate containing Al and a metal M having a crystalline structure, wherein said metal M is a metal selected from the group consisting of Ga, In, B, Mn, Bi, Sc, Y, V and Ta, wherein a transition metal or a precious metal is carried in said metal containing silicate, and wherein said catalyst has a ratio of Si/Al of not more than 100.

2. A catalyst as recited in claim 1 wherein the amount of the transition metal included in the metal containing silicate is not less than 1.5 wt %.

3. A catalyst as recited in claim 1 wherein the amount of the precious metal included in the metal containing silicate is not less than 1.5 wt %.

4. A catalyst as recited in claim 1 wherein the metal containing silicate comprises Si and Al in a range of $15=<Si/Al=<100$ and the metal M in a range of $15=<Si/M=<150$ when the metal M is a transition metal.

5. A catalyst as recited in claim 1 wherein the metal containing silicate comprises Si and Al in a range of $15=<Si/Al=<100$ and the metal M in a range of $15=<Si/M=6000$ when the metal is a precious metal.

6. A catalyst as recited in claim 1 wherein a carrier for the catalyst is cordierite.

* * * * *